United States Patent [19]

Horikoshi et al.

[11] Patent Number: 4,832,918
[45] Date of Patent: May 23, 1989

[54] ROTARY OZONIZER

[75] Inventors: Kuniaki Horikoshi, Kiryu; Mikio Kimura, Kawasaki; Mototaka Sone, Sagamihara; Kunikatsu Yamazaki, Kawasaki, all of Japan

[73] Assignees: Inpal Co., Ltd., Gunma; Toyo Element Industry Co., Ltd., Kanagawa, both of Japan

[21] Appl. No.: 61,125

[22] Filed: Jun. 10, 1987

[30] Foreign Application Priority Data

| Jun. 12, 1986 | [JP] | Japan | 61-89873[U] |
| Aug. 11, 1986 | [JP] | Japan | 61-123189[U] |
| Oct. 3, 1986 | [JP] | Japan | 61-152185[U] |
| Oct. 24, 1986 | [JP] | Japan | 61-163271[U] |
| Dec. 27, 1986 | [JP] | Japan | 61-202759[U] |
| Mar. 6, 1987 | [JP] | Japan | 62-51759 |

[51] Int. Cl.$^4$ .................................. C01B 13/12
[52] U.S. Cl. ..................... 422/186.18; 422/186.07; 422/186.14
[58] Field of Search ............. 422/186.07, 186.11, 422/186.13, 186.14, 186.18; 204/176

[56] References Cited

U.S. PATENT DOCUMENTS

| 978,786 | 12/1910 | Small . |
| 2,159,206 | 5/1939 | Daily . |
| 4,386,055 | 5/1983 | McBride . |

Primary Examiner—John F. Terapane
Assistant Examiner—Susan Wolfe
Attorney, Agent, or Firm—Ladas & Parry

[57] ABSTRACT

A rotary ozonizer includes a drive motor for driving a rotor and an air compressor. The rotor is housed in a cylindrical body serving as an stationary electrode. The rotor is secured to a rotor shaft extending through the cylindrical body and rotating upon rotation of the motor through an insulating joint. The rotor serves as a rotary electrode, and provides an electrical discharge spaced relative to the cylindrical body. Electrical power supply portions are connected to the rotor and to the stationary electrode, and end plates are provided to cover open ends of the cylindrical body. The end plates rotatably support the rotor shaft. The motor, the insulating joint, the cylindrical body and the compressor are aligned coaxially in one of the embodiments of the present invention.

22 Claims, 10 Drawing Sheets

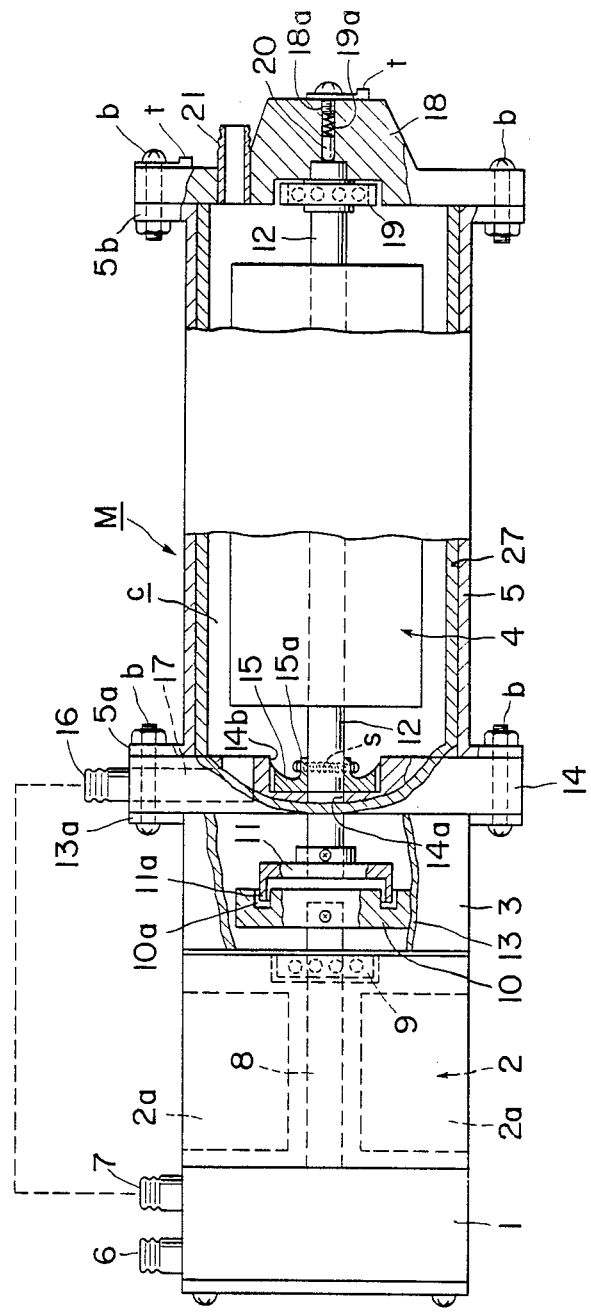
F I G. 1

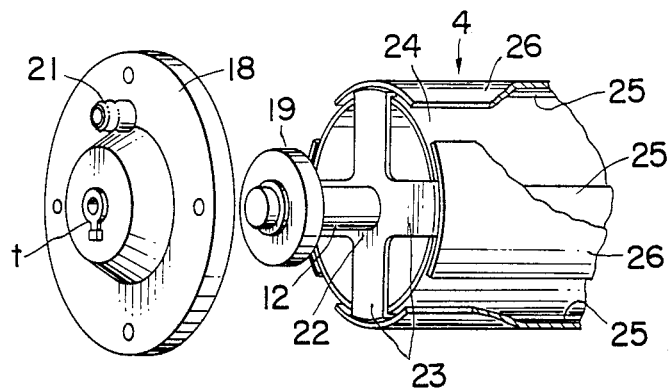
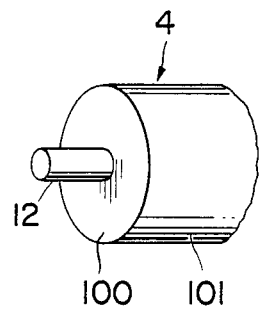
FIG. 2  FIG. 3
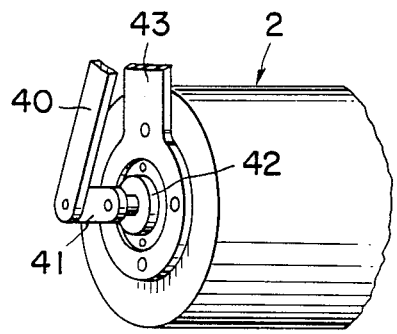
FIG. 5
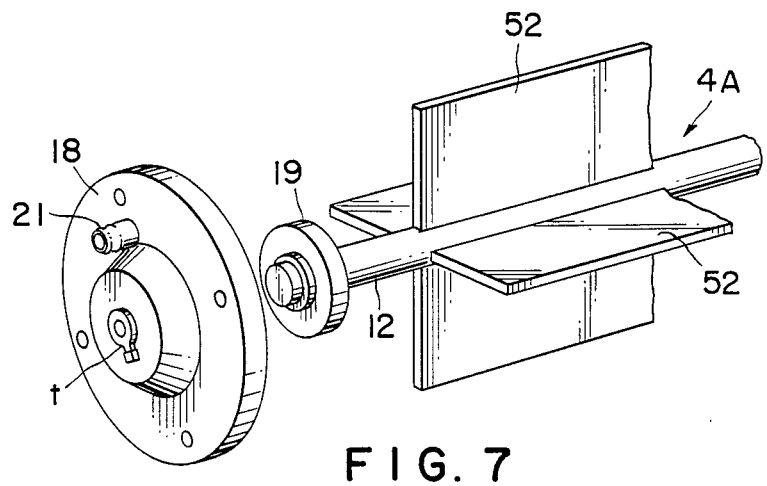
FIG. 7

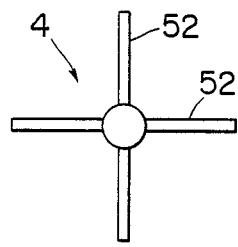
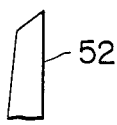 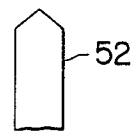
F I G. 9(a)   F I G. 9(b)
F I G. 8
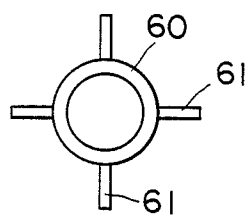
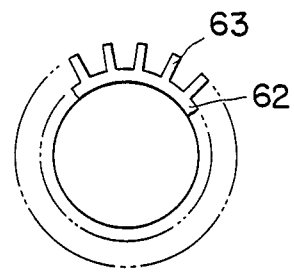
F I G. 10   F I G. 11
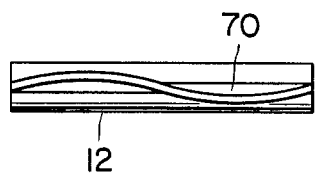
F I G. 12   F I G. 13

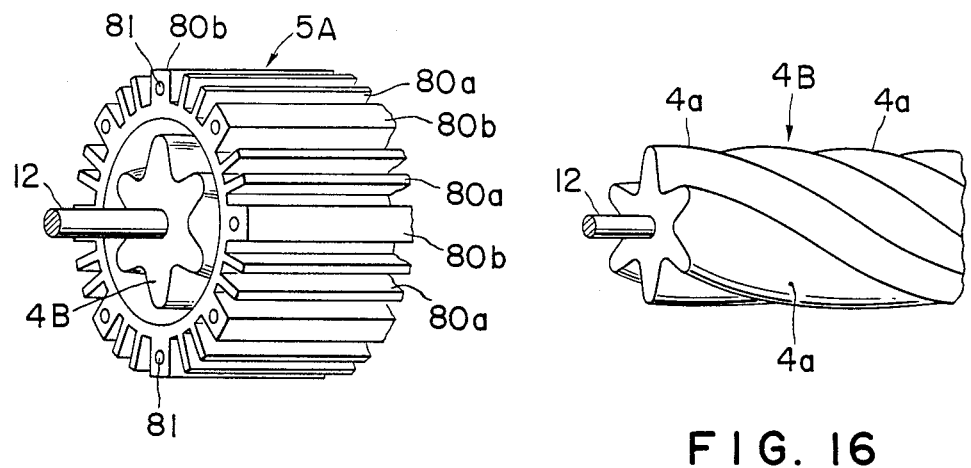
FIG. 15
FIG. 16
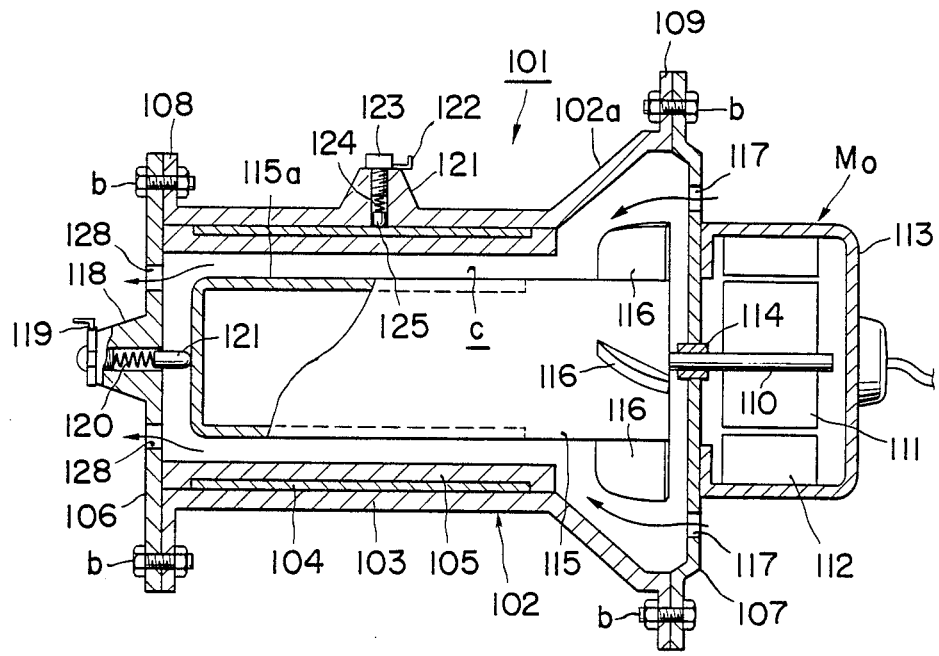
FIG. 17

ROTARY OZONIZER

BACKGROUND OF THE INVENTION

The present invention relates to a rotary ozonizer, and more particularly, to a type thereof in which high voltage is applied to a rotary and stationary electrodes to generate electrical discharge therebetween for converting air into ozone.

In a conventional ozonizer, plate electrodes or tubular electrodes are used to provide corona discharge, and air passes through the corona discharge space defined by the electrodes, so that oxygen is converted into ozone. There is provided another type of conventional ozonizer in which one of the electrodes is of movable type, and electric discharge space is defined between the movable electrode and a stationary electrode.

According to such conventional ozonizers it is difficult to process air in the electrical discharge space if the ozonizer is small in size. For example, dusts or moisture contained in the air may be adhered to the electrode surface, so that hydrogen compound is formed. As a result, ozone generating efficiency may be lowered. Further, the hydrogen compound may accidentally perform electrical current collection, so that stabilized ozone generation may not be obtainable by a compact ozonizer.

A conventional rotary type ozonizer is disclosed in Japanese Patent Laid-Open Publication (Kokai) No. 125606/1983. In the publication, on one side of a motor is provided an ozone generating portion while on the other side of the motor is provided a sirocco fan for supplying compressed air into the ozone generating portion. The ozone generating portion comprises a rotor serving as a rotary electrode and a cylindrical body serving as a stationary electrode.

In the above conventional ozonizer, the sirocco fan, the motor and the ozone generating portion are all separated from one another. Therefore, a compact ozonizer may not be obtainable. Particularly, the sirocco fan as a compressed air source requires large volume, so that overall apparatus becomes bulky. Further, sufficient sealability may not be attainable at the rotary portion, to inadvertently provide ozone leakage.

Furthermore, the cylindrical body which serves as the stationary electrode is heated by the high voltage current, which degrades ozone generating efficiency, and a cooling means may be required to cool the cylindrical body. Moreover, a duct is required to provide fluid communication between the sirocco fan and the cylindrical body, so that large numbers of mechanical parts are required to render the resultant apparatus being bulky. Therefore, each apparatus is incapable of installing on a small size electrical equipment such as a refrigerator.

SUMMARY OF THE INVENTION

It is therefore, an object of the present invention to overcome the above-mentioned drawbacks and to provide an improved rotary ozonizer.

Another object of the invention is to provide such rotary ozonizer capable of providing stabilized ozone generation between rotary and stationary electrodes.

Still another object of the invention is to provide such improved ozonizer which can minimize air and ozone leakage.

Still another object of the invention is to provide the ozonizer having simple and compact construction at low cost.

Still another object of the invention is to provide the ozonizer without having a special cooling means.

Still another object of the invention is to provide the ozonizer capable of reducing a number of mechanical parts with reduced axial length.

Still another object of the invention is to provide the ozonizer capable of being installed on a small size refrigerator.

Briefly, and in accordance with the present invention, a rotary ozonizer generally includes a motor, a cylindrical body, a rotor an insulating joint, an air compressor, insulating and plates, and electrical power supply portion. The motor has a motor shaft extending from both sides of the motor, and the cylindrical body accommodates therein a stationary electrode. The rotor is disposed in an interior space of the cylindrical body and is secured to a rotor shaft. The rotor serves as a rotary electrode in confrontation with the stationary electrode. An electrical discharge space is provided between the rotor and the cylindrical body. The insulating joint is disposed between the motor and the cylindrical body for connecting the rotor shaft to the motor shaft. The air compressor is connected to the motor shaft. The insulating end plates are disposed to cover open ends of the cylindrical body and to rotatably and sealingly support the rotor shaft. One of the end plates is positioned adjacent to the insulating joint and other end plate is provided with the electrical power supply portion. The electrical power supply portion includes a terminal, a spring having one end connected to the terminal, and a contact member having one end connected to the other end of the spring and the other end in contact with a distal end face of the rotor shaft by the biasing force of the spring. A passage is provided for introducing a compressed air in the compressor into the electrical discharge space.

According to a first embodiment of the present invention, the motor, the cylindrical body, the insulating joint and the air compressor are all coaxially aligned. Upon rotation of the motor, the air compressor and the rotor are driven by the rotation of the rotor, and electrical discharge occurs between the rotary electrode and the stationary electrode so that the compressed air oxygen is converted into ozone.

According to a second embodiment of the present invention, the compressor is disposed offset from the coaxial line defined by the motor, insulating joint and the cylindrical body. The compressor is a diaphragm type compressor which is operable by the motor through a reciprocating mechanism. In the second embodiment, axial length of resultant apparatus can be reduced because of offset position of the compressor.

According to a third embodiment of the present invention, the rotor comprises a plurality of blades projecting radially from the rotor shaft. With the structure, electric current can be concentrated at each free end of the blades, so that effective electric discharge occurs between the stationary electrode and the blades, to thereby enhance ozone productivity.

According to a fourth embodiment, the rotor provides a plurality of spiral projections capable of agitating compressed air ambient thereto to thereby obtain air turbulent flow. At the same time, the spiral projections positively feed the air. Further, the cylindrical body is provided with heat radiating fins. With the structure, effective ozone generation is attainable and excessive heating to the electrodes can be obviated.

In a fifth embodiment of the present invention, there is provided a fan member in a cylindrical body. More specifically, the fifth embodiment includes a motor, a cylindrical body disposed coaxially with the motor and serving as a stationary electrode, and a rotor housed in the cylindrical body and having one end connected to the motor. The rotor serves as a rotary electrode. A first electrical power supply portion is provided to supply electric current to the rotor, and a second electrical power supply portion is provided at the cylindrical body. The fan members are disposed at one end portion of an outer peripheral portion of the rotor. External air is supplied into the cylindrical body through at least one air inlet by the rotation of the fans, and generated ozone is discharged through a discharge port positioned opposite to the air inlet with respect to the fans. With the structure, it is unnecessary to further provide an air compressing means such as a sirocco fan.

In a sixth embodiment of the present invention, there is provided a motor, rotary blades each serving as a rotary electrode, a casing for housing the rotary blades and serving as a stationary electrode. The rotary blades serve also as air compression means, so that a compact apparatus results.

BRIEF DESCRIPTION OF THE DRAWINGS

In the accompanying drawings:

FIG. 1 is a front view partly in cross-section showing a rotary ozonizer according to a first embodiment of the present invention;

FIG. 2 is a perspective view showing a rotor of the first embodiment;

FIG. 3 is a perspective view showing a rotor modified used in the first embodiment;

FIG. 5 is a perspective view showing an end portion of a motor according to the second embodiment;

FIG. 7 is a perspective view showing a rotor in the third embodiment; FIG. 8 is a front view of a rotor shown in FIG. 7; FIGS. 9(a) and 9(b) show tip end configurations of a blade of a rotor;

FIG. 10 is a front view of a rotor of a first modification to a rotor shown in FIG. 8;

FIG. 11 is a front view of a rotor of a second modification to a rotor shown in FIG. 8;

FIG. 12 is a third modification of a rotor;

FIG. 13 shows a fourth modification of a rotor;

FIG. 15 is a perspective view showing a cylindrical body of the fourth embodiment;

FIG. 16 is a perspective view showing a rotor of the fourth embodiment;

FIG. 17 is a cross-sectional view showing a rotary ozonizer according to a fifth embodiment of the present invention;

DETAILED DESCRIPTION OF THE INVENTION

First, a conventional type ozonizer disclosed in Japanese Patent Laid-Open Publication No. 125606/1983 is explained in order to understand the characteristic features of this invention in comparison with the conventional ozonizer.

Figure 23:
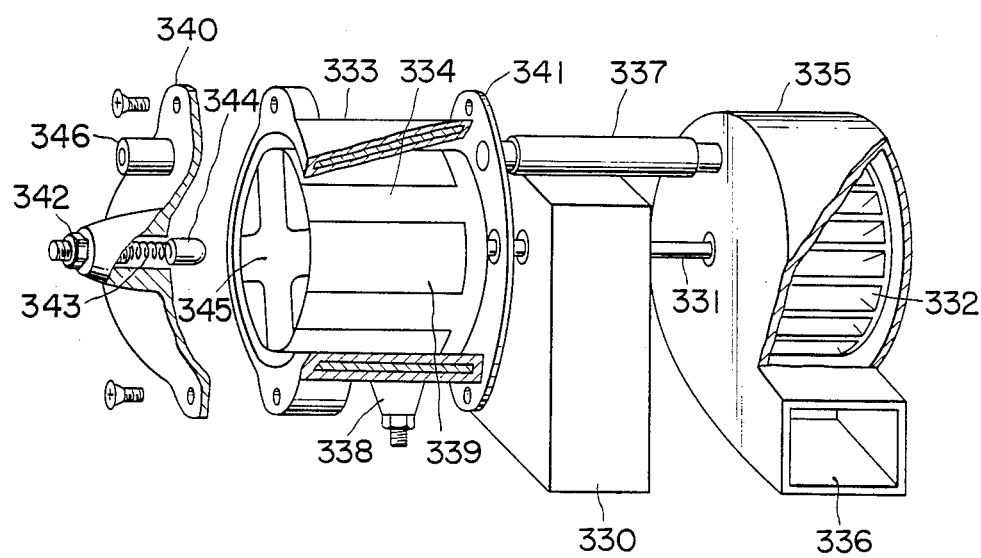
FIG. 23 is a perspective view showing a conventional rotary ozonizer.

In the publication, as shown in FIG. 23, a motor 330 is provided with a motor shaft 331 having one end portion connected to a compressor such as a sirocco fan 332 and the other end portion connected to a rotor 334 housed in a cylindrical body 333 which serves as a stationary electrode. The sirocco fan 332 is housed in a fan casing 335 provided with an air intake passage 336. Air taken into the fan casing 335 through the intake passage 336 is compressed by the sirocco fan 332, and the compressed air is supplied into the cylindrical body 333 through a duct 337 connected between the casing 335 and the cylindrical body 333. An electrical power supply portion 338 is provided at a peripheral portion of the cylindrical body 333.

A plurality of rotary electrodes 339 are provided at a peripheral surface of the rotor 334. Ozone is generated by the electrical discharge between the rotary electrodes 339 and the stationary electrode 333.

Axial end portion of the cylindrical body 333 is closed by end plates 340 and 341. Another electric power supply portion 342 is provided at an outer central portion of the end plate 340. The electric power supply portion 342 is connected to a contact member 344 through a spring 343, and the contact member 344 is in abutment with an electrically conductive end plate 345 of the rotor 334. With this construction, when high voltage is applied to the electric power supply portions 338 and 342, electric discharge occurs between the stationary and rotary electrodes, so that ozone is generated in the cylindrical body 333. The ozone is discharged out of the body 333 through a discharge port 346.

According to the conventional rotary ozonizer, the sirocco fan 332, the motor 330 and the electrode members 333 and 339 are all separated from one another. Particularly, the sirocco fan 332 which is a compressed air source requires a large volume. Moreover, the duct 337 is required to provide fluid communication between the fan 332 and the cylindrical body 333, so that large numbers of mechanical parts are required to make the apparatus bulky. Therefore, such apparatus is incapable of installing on a small size electrical equipment such as a refrigerator.

Now, a first embodiment of the present invention will be described with reference to FIGS. 1 to 3. In FIG. 1, a rotary ozonizer M according to the first embodiment includes an air compressor 1, a motor 2 having a stator 2a, an insulating joint 3 and a cylindrical body 5 housing therein a rotor 4, the body 5 being functioned as a pressure container. In this embodiment, the compressor 1, motor 2, joint 3 and body 5 are coaxially arranged. The motor 2 is an electric motor. However, other type of rotary driving means such as an air motor is also available.

The air compressor 1 is a rotary compressor in which an air inlet 6 and an air outlet 7 are provided. Air introduced into the compressor through the air inlet 6 is compressed, and the compressed air is supplied into the cylindrical body 5 through the air outlet 7. The air compressor per se is well known.

A motor shaft 8 of the motor 2 has one end fixed with a rotor of the compressor, and the other end provided with a circular female joint 10. The other end portion of the shaft 8 is rotatably supported by a bearing 9. A rotary shaft 12 of the rotor 4 has one end provided with a male joint 11 having a projecting portion 11a which is coupled to a recessed portion 10a of the female joint 10. A cover sleeve 13 is provided over these joints 10 and 11. The sleeve 13 and the joints 10 and 11 are made of highly insulative resin capable of electrical insulation between the rotor 4 and the motor 2.

An end plate 14 is provided between the cylindrical body 5 which functions as the pressure container and the covering sleeve 13 of the insulating joint 3. The end plate 14 is interposed between a flange 5a provided at one end of the cylindrical body 5 and a flange 13a of the covering sleeve 13, and is clamped therebetween by bolts b. The inner end of a contact member 20 is in abutment with an end surface of the rotary shaft 12 supported by a bearing 19.

At a position adjacent the frusto-conical projection of a end plate 18, ozone discharge port 21 is formed for discharging ozone produced in the container 5.

As shown in FIG. 2, a cross-like supporting member 22 is provided at the rotary shaft 12. The supporting member 22 has four arms 23 to which rotary electrodes 25 are connected. Each of the rotary electrodes 25 is disposed along an outer peripheral surface of a cylindrical insulating body 24 of the rotor 4 and extends in axial direction thereof. The rotary electrodes 25 are covered with an insulating member 26 formed of ceramic or Teflon (polytetrafluoroethylene). As a modification to an embodiment shown in FIG. 2, electrically conductive disk member 100 is provided at the rotary shaft 12, and cylindrical rotary electrode 101 is fixed to the disk 100 as shown in FIG. 3. In this modification, the insulating member 26 is not necessarily required.

The cylindrical body 5 which serves as the pressure container also serves as a stationary electrode which confronts the rotary electrode 25 of the rotor 4. An insulation sleeve 27 is disposed at an inner peripheral surface of the stationary electrode 5, so that electrical discharge space c is defined between the insulation sleeve 27 and the rotor 4. Incidentally, the insulation sleeve 27 is not absolutely required.

A hole 14a is formed at a center of the end plate 14 to allow the shaft 12 of the rotor 4 to pass therethrough. Further, a circular recessed portion 14b is formed at the end plate 14, and a shaft seal 15 is fitted with the circular recessed portion 14b. The shaft seal 15 is provided with an annular bearing portion 15a having a small thickness, and a spring member s is disposed on an outer peripheral surface of the bearing portion 15a so as to minimize a gap between the shaft 12 of the rotor 4 and the bearing portion 15a.

A compressed air inlet 16 is provided at the end plate 14. The compressed air from the compressor 1 is supplied into the pressure container 5 through the compressed air inlet 16 and a passage 17 formed in the end plate 14 and connected to the inlet 16.

The other end plate 18 is provided at the other end of the cylindrical body 5. That is, an annular flange 5b is provided at the other end of the body 5, and the second end plate 18 is fixedly secured to the flange 5b by bolts b. A bearing 19 is provided at an inner side of the end plate 18 so that the rotary shaft 12 of the rotor 4 is rotatably supported by the bearing 19. The end plate 18 has an outer side provided with a frusto-conical projecting portion. At the center of the frusto-conical projection and at a peripheral portion, terminals t, t are provided for electrical power supply. At the central portion of the frusto-conical body, through-hole 18a is formed, and a coil spring 19a is disposed in the through-hole 18a. The coil spring 19a has an outer end connected to one of the terminals t, and an inner end urging a contact member 20 formed of carbon.

In operation, the motor 2 is energized, and at the same time, high voltage is applied between the terminals t and t provided at the end plate 18, so that the air compressor 1 is actuated and the rotor 4 is rotated. Air compressed by the air compressor 1 is introduced into the cylindrical body 5 through the compressed air inlet 16 at the end plate 14. Upon rotation of the rotor 4, electrical current discharge occurs between the rotary electrodes 25 and the stationary electrode 5, and ozone is generated at the space c. Thus produced ozone is discharged toward outside through the ozone discharge port 21 provided at the end plate 18.

Since both ends of the rotary shaft 12 of the rotor 4 are supported by bearing portions each provided at the end plates 14 and 18, vibration of the rotor can be eliminated. Particularly, since the rotary shaft is sealed at its portion passing through the end plate 14, ozone leakage is avoidable. Further, the motor 2 and the insulating space c is completely electrically insulated from each other, since the motor 2 is connected to the cylindrical body 5 through the insulation joint 3. Furthermore, the rotating rotary shaft 12 is subjected to complete electric power supply, since the electrical current is supplied to the end surface of the rotary shaft 12 by way of the carbon contact member 20 and the coil spring 19 which urges the contact member 20 toward the end surface. Moreover, efficient operation results, since the air compressor and the rotor 4 are operated by the same motor 2.

According to the present invention, the resultant ozonizer has a compact construction, and provides highly insulative characteristic with minimized ozone leakage.

Figure 4:
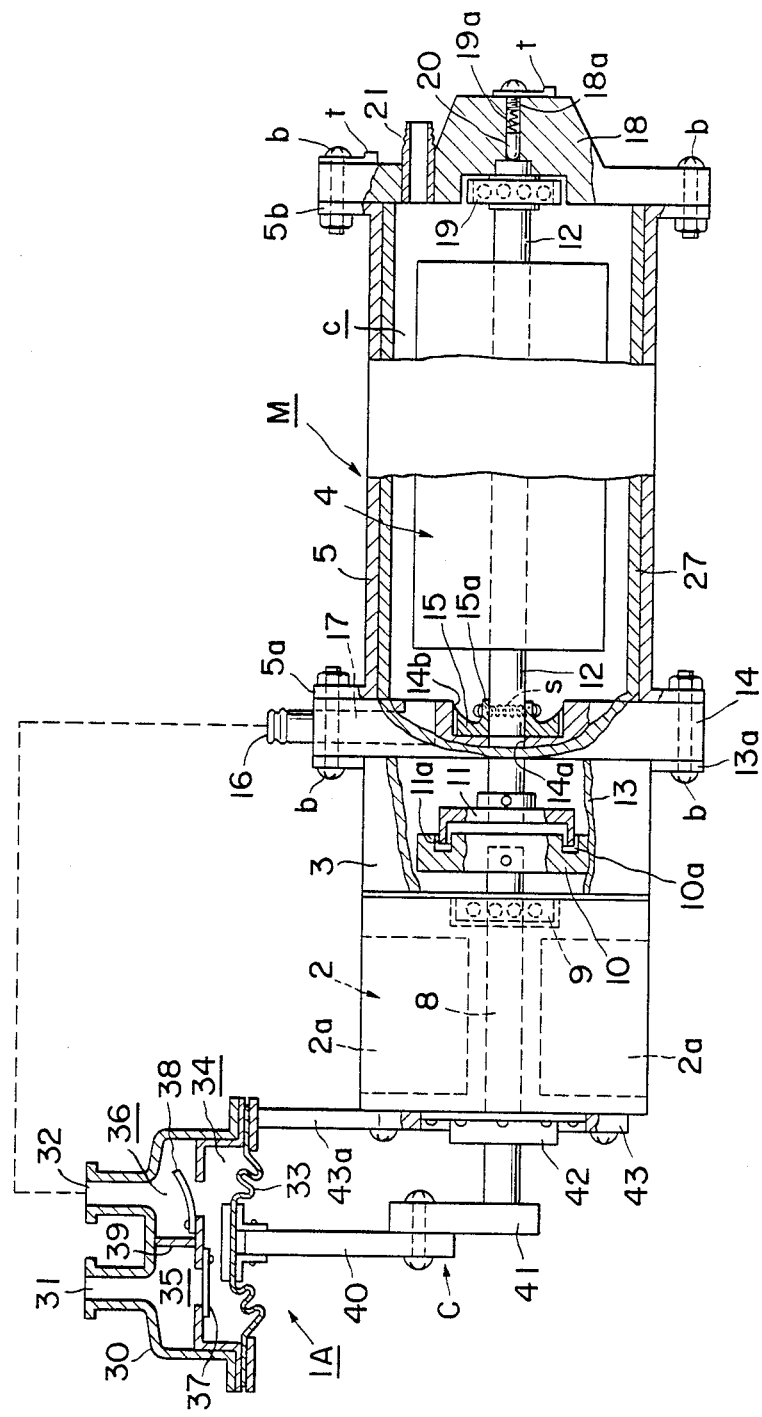
FIG. 4 is a front view partly in cross-section showing a rotary ozonizer according to a second embodiment of the present invention.
Figure 6:
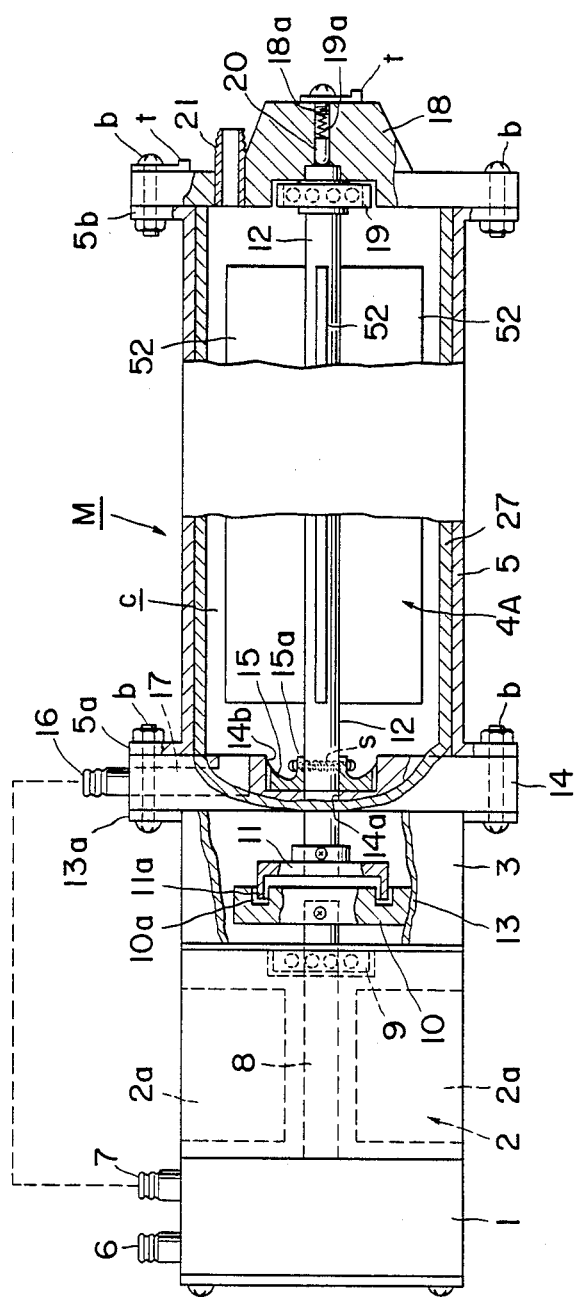
FIG. 6 is a front view partly in cross-section showing a rotary ozonizer according to a third embodiment of the present invention.

Second embodiment according to the invention will be described with reference to FIGS. 4 and 5, wherein like parts and components are designated by the same reference numerals and characters as those shown in the first embodiment. In the first embodiment, the compressor, the motor, the insulating joint and the cylindrical body are coaxially arranged, whereas in the second embodiment, a motor 2, an insulating joint 3 and a cylindrical body 5 are coaxially arranged, and a compressor 1A is disposed offset from the coaxial center. The compressor 1A is of diaphragm type. The compressor 1A includes a casing 30 whose upper portion is provided with an air inlet port 31 and an air outlet port 32. Air which has entered the compressor 1A through the air inlet port 31 is compressed, and the compressed air is introduced into a cylindrical body 5 through the air outlet port 32.

A bottom of the casing 30 is closed by a diaphragm 33 to define a diaphragm chamber 34. Atmospheric air is intaken into the diaphragm chamber 34 through an intake chamber 35, and compressed air in the chamber 34 is supplied to the outlet port 32 through an outlet chamber 36. An intake valve 37 is disposed between the diaphragm chamber 34 and the intake chamber 35, and an exhaust valve 38 is disposed between the diaphragm chamber 34 and the outlet chamber 36. The intake chamber 35 and the outlet chamber 36 are partitioned by a partition wall 39.

An upper end of a support arm 40 is fixedly connected to a central portion of the diaphragm 33. The support arm 40 is a part of a crank mechanism C (or cam mechanism) in a power transmission mechanism. Lower end of the support arm 40 is pivotally supported to a rotary arm 41 which is connected to a motor shaft 8. A left end plate 43 of the motor 2 is provided with a bearing 42 for rotatably supporting the motor shaft 8, and a support plate 43a extends from the end plate 43 for supporting the casing 30 at a position offset from the motor shaft 8. Instead of the diaphragm type compressor 1A, an ordinary reciprocation type compressor is also available.

According to the second embodiment, as is similar to the first embodiment, an entire device is compact in size, and highly insulative characteristic is obtainable without substantial ozone leakage. Further, in the second embodiment, since the compressor body is offset from the motor shaft, the entire device is compact in size in longitudinal direction thereof.

A third embodiment of the present invention will be described with reference to FIGS. 6 to 13 wherein like parts and components are designated by the same reference numerals and characters as those shown in the foregoing embodiments. The third embodiment is substantially similar to the first embodiment except a rotor housed in a cylindrical body 5. In the first embodiment shown in FIGS. 1 and 2, the rotor 4 is cylindrical shaft, whereas in the third embodiment vanes are provided instead of the cylindrical rotor. More specifically, a rotor 4A shown in FIGS. 6 to 8 includes four blades 52 each extending radially outwardly from a rotary shaft 12 and angularly spaced away from each other at every 90°. A free end of each of the blades 52 is in a form of a single knife edge as shown in FIG. 9(a). Alternatively, the free ends are in the form of a dual knife edge as shown in FIG. 9(b). Further, as shown in FIG. 10, a plurality of blades 61 extend from a hollow rotary shaft 60, and as shown in FIG. 11, teeth-like blades 63 extend from a hollow rotary shaft 62. The blades 63 may be formed integral with the hollow shaft 62, or may be formed separately relative to the shaft 62 and are mounted thereon. Furthermore, as shown in FIG. 12, a plurality of corrugated blades 70 are mounted on a rotary shaft 12 to render air to blow in an axial direction thereof. Furthermore, as shown in FIG. 13, a spiral rib or blade 72 is mounted on a hollow rotary shaft 71.

In the third embodiment, upon rotation of the rotor 4A, electrical discharge occurs between each free end of the blades and the stationary electrode 5, so that ozone is generated at the electrical discharge space C. Thus generated ozone is discharged out of the space through the ozone discharge port 21. In this case, efficient electrical discharge is attainable for the ozone generation, since electric current is concentrated at the free ends of the blades. The blade having knife edge shape permits the electric current to be concentrated at its free end, to thereby increase electric discharge efficiency.

According to the embodiment, thus constructed, electric discharge efficiency is improved to improve ozone generation efficieny, while overall construction becomes simplified and compact without specific requirement for cooling means.

Figure 14:
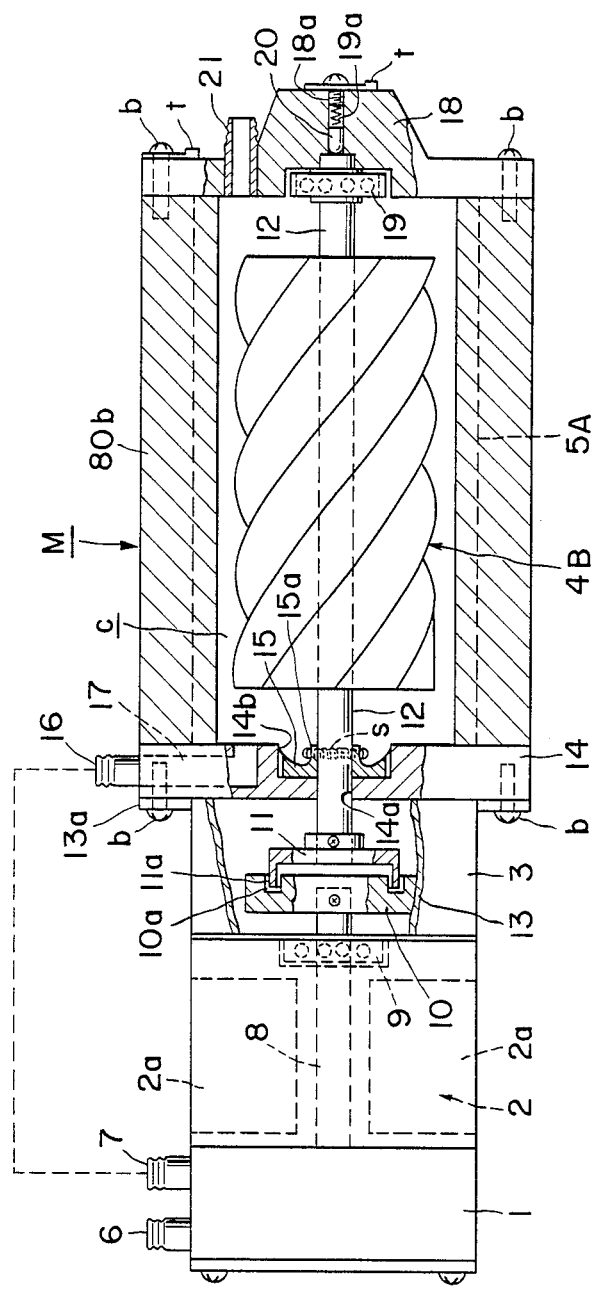
FIG. 14 is a front view partly in cross-section showing a rotary ozonizer according to a fourth embodiment of the present invention.

Referring next to the fourth embodiment shown in FIGS. 14 to 16, wherein like parts and components are designated by the same reference numerals and characters as those shown in the foregoing embodiments, overall construction would be similar to that of the first embodiment except the rotor (rotary electrode) and the cylindrical body (stationary electrode).

In the fourth embodiment as shown in FIGS. 14 and 15, a cylindrical body 5A has an outer peripheral surface provided with a plurality of heat radiating fins 80a having a small thickness, and a plurality of thick wall heat radiating fins 80b each positioned between the thin radiating fins at equidistant circumferential positions.

Thread holes 81 are formed at both planar ends of the thick radiation fins 80b so as to fix end plates 14 and 18 thereto by bolts b. The configuration of the fins 80a and 80b is not limited to continuously linear ribs extending in axial direction of the cylindrical body 5A and having rectangular cross-section as shown in FIG. 15. Instead, discontinuous fins (not shown) each extending in the axial direction with an axial space would also be available. Further, annular fins (not shown) disposed over the body 5A are also available. The cylindrical body 5A is formed of ozone-resistant material such as stainless steel and aluminum. Further integral molding by casting is preferable for making the body 5A in terms of production cost.

A rotor 4B includes a plurality of spiral ribs 4a provided over a rotary shaft 12 as shown in FIG. 16. These spiral ribs agitate ambient air when the shaft 12 is rotated so that turbulent air is provided. Moreover, surface area of the rotor 4B is increased by these ribs, and these ribs provided positive air feed, so that ozone generation is increased.

According to the fourth embodiment, when electrical discharge occurs between the rotor 4B and the cylindrical body 5A, the cylindrical body 5A has a high temperature due to the heat generated by the discharge. However, the heat can be radiated through the heat radiation fins 80a, 80b, so that a temperature increase of the body 5A can be prevented, to thus increase ozone generating efficiency. Further, since the rotor 4B has a spiral configuration, air in the electrical discharge space C is agitated to provide turbulent flow. Because of the air turbulation, non-uniformity of electrical discharges dependent on positions at which the discharges occur can be obviated, to thereby provide uniform electric discharge, to thus provide uniform ozone generation at every part of the space C. Further, the spiral configuration provides a large surface area, and can allow air to positively flow, so that ozone generation density is enhanced for increasing ozone generation efficiency. With this structure, special cooling means is avoidable to realize an ecconomical apparatus.

Figure 18:
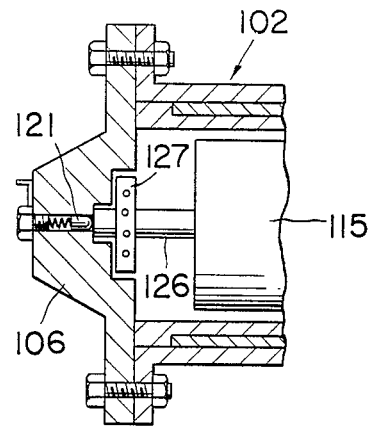
FIG. 18 is a cross-sectional view showing a supporting structure for supporting a rotor, and which structure is a modification to the fifth embodiment.

A fifth embodiment will be described with reference to FIGS. 17 and 18. In FIG. 17, an ozonizer 101 includes a cylindrical body 102 which comprises an outer casing 103, an electrically conductive stationary electrode 104 having cylindrical shape and positioned inside the casing 103, and an insulation member 105 covering an inner peripheral surface of the stationary electrode 104. One end portion of the cylindrical body 102 (right side in FIG. 17) is provided with a hollow frusto-conical portion 102a whose diameter is increased toward its distal end. The other end portion of the body 102 and the distal end of the frusto-conical portion 102a are closed by insulation end plates 106 and 107, respectively. Peripheral end portions of the end plates 106, 107 are fixedly secured to flange portions 108 and 109 of the casing 103 by bolts b.

A motor $M_0$ is secured to the end plate 107. The motor M includes a rotation shaft 110, rotor 111, and stator 112, these being accommodated in a motor casing 113. The motor shaft 110 is rotatably supported by a bearing 114 disposed at a central position of the end plate 107. The motor shaft 110 is fixedly connected to one end face of a rotor 115 which serves as a rotary electrode. The rotor 115 includes an electrically conductive body 115a which confronts the stationary electrode 104.

A plurality of fans 116 are provided integrally with an outer peripheral surface of the rotor 115 at a position inside the frusto-conical body 102a. These fans 116 have a configuration to introduce external air into the interior of the cylindrical body 102. Air inlets 117 are provided at a portion adjacent to an outer peripheral end portion of the end plate 107, so that external air is forcibly intaken into the cylindrical body 105 by the fans 116 through the air inlets 117.

An electric power supply portion 118 is provided at the opposing end plate 106. The power supply portion includes a terminal 119 to which high voltage is applied, and a carbon contact 121 biased by a spring 120. The contact 121 is in abutment with a central portion of the rotor 115 by the biasing force of the spring 120. On the other hand, another electrical power supply portion 121 is provided at a peripheral portion of the cylindrical body 102. The power supply portion 121 includes a terminal 122, a spring holder 123, a spring 124 and a contact 125 in contact with the stationary electrode 104.

The motor $M_0$ is not necessarily an electrical motor, and other types of rotation drive means are available. Further, in FIG. 17, the rotor 115 is supported by the end plate 107 by the bearing 114 in a cantilevered form, in which the left side of the rotor 115 is merely in surface contact with the tip end of the contact 121. However, double bearing type support is also applicable in which, as shown in FIG. 18, another shaft 126 extends from the end face of the rotor 115, the end face being at a position opposite to the motor $M_0$ with respect to the end plate 107, and the shaft 126 is rotatably supported by a bearing 127 implanted in the end plate 106. In this case, the contact 121 is in abutment with the end face of the shaft 126. With the modified structure, the rotor 15 can be supported without its distortion.

In operation, upon rotation of the motor $M_0$, the rotor 115 is rotated to intake air into the cylindrical body 102 through the air inlets 117 formed in the end plate 107. The air is supplied to an electrical discharge space C defined between the inner peripheral surface of the cylindrical body 102 and the outer peripheral surface of the rotor 115. High voltage is applied between the power supply portions 118 and 121 for generating electrical discharge at the space C, so that ozone is generated. The ozone is discharged through the outlets 128 formed at the end plate 106. According to the fifth embodiment, since fans are provided at one end portion of and integral with the rotor, a compact apparatus available for a small size electrical equipment such as a small size refrigerator can be obtained.

Turning next to a sixth embodiment shown in FIG. 19 to 22, a rotary ozonizer 201 generally includes a motor $M_1$ and a ozone generation unit U. A motor shaft 202 is connected to a conductor shaft 204 through an insulation sleeve 203 formed of fluorine material. A disk end plate 206 is fixedly secured to the shaft 204. The disk end plate 206 is adapted to support each one end of rotary blades 205 such as siroccco fan blades.

The sirocco fan 205 is housed in a casing 207 made of insulation material. The casing 207 is provided with a high voltage supply portion 207a at a central portion thereof. The high voltage supply portion 207a is formed with a bore 208 in which a contact 210 made of carbon is disposed. One end of the contact 210 is biased by a spring 209 toward the shaft 204, so that the other end of the contact 210 is in abutment with an end face of the shaft 204. The spring 209 is connected to a high voltage feed line 212 through a screw 211. The casing 207 is provided with an end plate 213 at a position in confrontation with the motor $M_1$. The end plate 213 is formed with air inlets 213a, and the casing 207 is provided with a discharge passage 237 extending in tangential direction of the sirocco fan 205. Terefore, air introduced through the air inlets 213a into the casing 207 is discharged outside through the discharge passage 237. The end plate 213 is formed of insulating material such as fluorine. The plate 213 is fixed to the motor $M_1$ by screws 214, and outer peripheral portion of the plate 213 is coupled to a flange 207b of the casing 207 by bolts 215.

Figure 19:
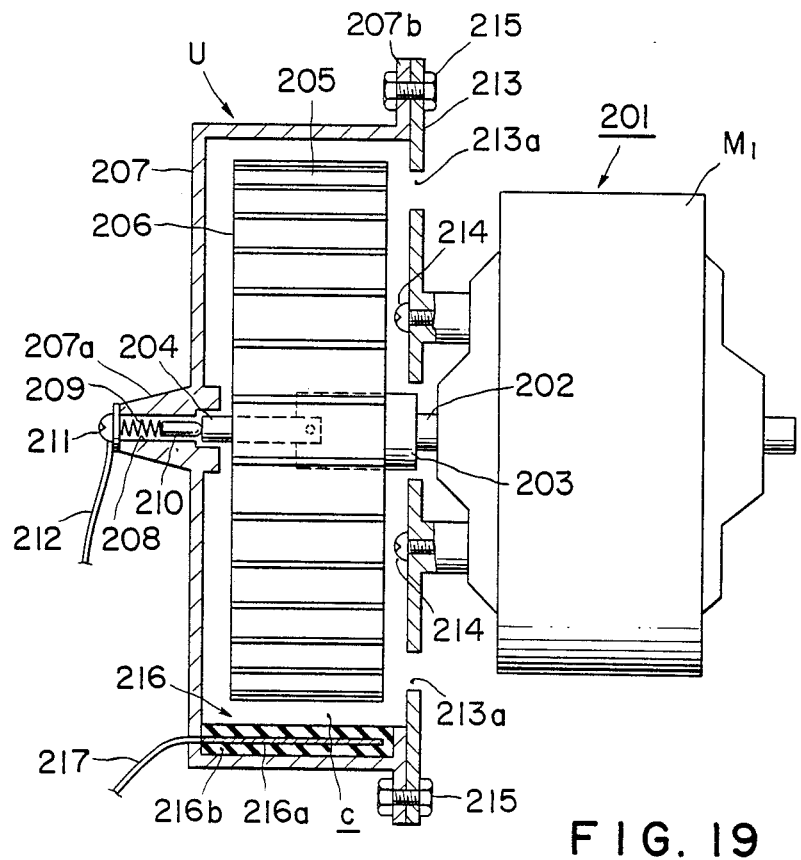
FIG. 19 is a cross-sectional view showing a rotary ozonizer according to a sixth embodiment of the present invention.
Figure 20:
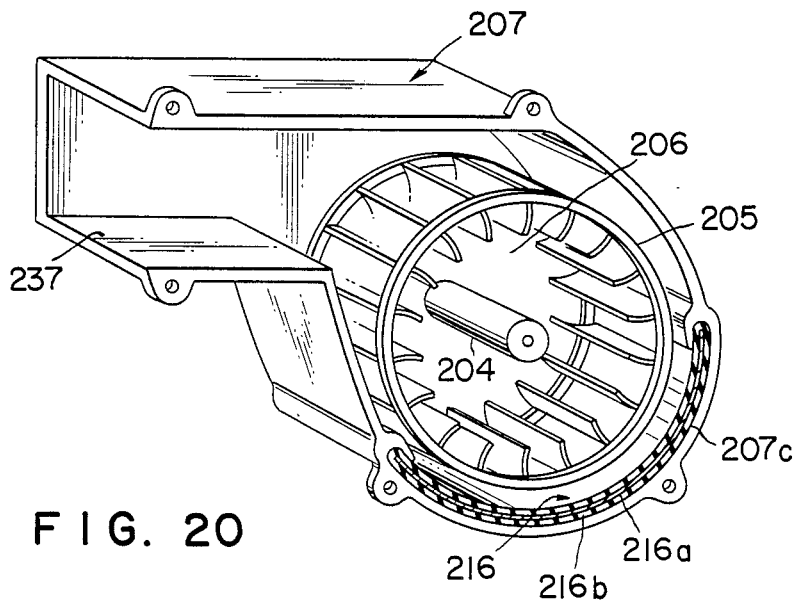
FIG. 20 is a perspective view showing a casing of the ozonizer according to the sixth embodiment.

As best shown in FIG. 20, a cylindrical portion of the casing 207 is formed with a conductor accommodating portion 207c, into which an arcuate stationary electrode 216 is accommodated. The stationary electrode 216 includes a thin conductor 216a formed of SUS (defined by JIS), which is covered with an insulation member 216b. The conductor 216a is connected to a high voltage feed line 217 (FIG. 19). Further, as shown in FIG. 21, the conductor accommodating portion 207c is formed with recesses 207d for detachably providing the stationary electrode 216 at its both ends.

The sirocco fan 205 is formed of electrically conductive material for serving as electric current discharge body at its radially outer end. Electrical discharge space C is defined between the radially outer end of the fan 205 and the stationary electrode 216. With this structure, air intaken into the casing 207 through the air inlets 213a is compressed, and the compressed air is converted into ozone by the application of electrical discharge, and thus generated ozone is discharged from the casing 207 through the discharge passage 237.

Figure 21:
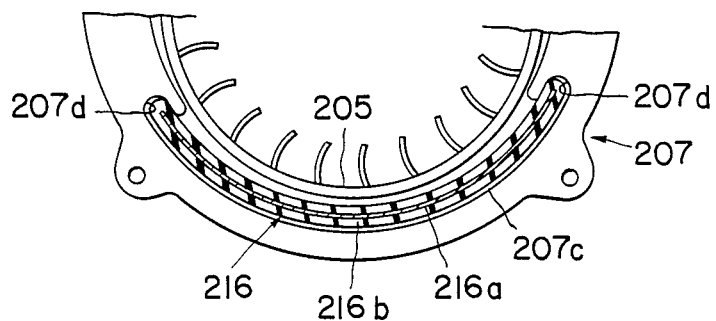
FIG. 21 is an enlarged view showing a conductor accommodating portion of the casing shown in FIG. 20.
Figure 22:
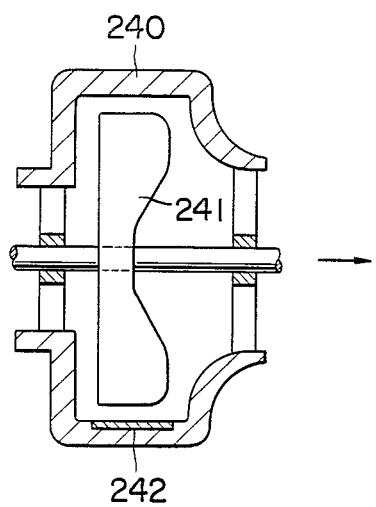
FIG. 22 is a cross-sectional view showing a modification to the sixth embodiment.

In the sixth embodiment shown in FIGS. 20 to 21, the sirocco fan 205 is employed. However, as shown in FIG. 22, a propeller fan 241 is also available. The propeller fan 241 is rotatably disposed in a casing 240, and an electrical discharge space is provided between radially outer ends of the fan 241 and the casing 240 providing therein an stationary electrode 242.

According to the sixth embodiment, the fan is used as the rotary electrode, and part of the casing is used as the stationary electrode. Therefore, the ozonizer is provided by only the motor and the fan unit, to thereby simplify the overall apparatus minimizing mechanical parts. Further, axial length of the motor shaft can be reduced to thus provide an economical apparatus.

While the invention has been described in detail with reference to specific embodiments, it is apparent for those skilled in the art that various changes and modifications can be made without departing from the scope and spirit of the invention.

What is claimed is:

1. A rotary ozonizer comprising:
an electric motor having a motor shaft extending from both sides of the motor;
an insulating joint means having a cover sleeve fixedly secured to one side of the motor coaxially with the same;
a first end plate fixed to said cover sleeve at the side thereof remote from said motor;
a cylindrical body forming a stationary electrode and detachably secured to said first end plate at the side thereof remote from the cover sleeve;
said cylindrical body being coaxial with said motor and cover sleeve;
a rotor disposed within said cylindrical body to form a rotary electrode and mounted on a rotary shaft, said rotor and said cylindrical body defining therebetween an electrical discharge space, said rotary shaft extending in an sealed manner through said first end plate coaxially with, and toward said motor and being coupled to said motor shaft through an electrically insulating joint disposed within said cover sleeve;
a second end plate secured to said cylindrical body at the side thereof remote from said first end plate to close the interior space of the cylindrical body, the second end plate rotatably supporting the end of said rotary shaft remote from said joint;
an air compressor connected to said motor shaft at the other side of said motor;
means for electrically connecting said cylindrical body and said rotor to an electrical power source;
passage means formed through said first end plate and opening into the interior of said cylindrical body;
means connecting said air compressor to said passage means to introduce compressed air from the compressor into said electrical discharge space; and
ozone discharge port means provided longitudinally of said cylindrical body through said second end plate for discharging therethrough ozone generated in said electrical discharge space, due to the pumping operation of the air compressor.

2. A rotary ozonizer as claimed in claim 1, wherein said air compressor is a rotary compressor, and rotary axis of said rotary compressor is aligned with said motor, said insulating joint and said cylindrical body.

3. A rotary ozonizer as claimed in claim 1, wherein said air compressor is a diaphragm type compressor, said compressor being positioned offset from the common axis of said motor said insulating joint and said cylindrical body.

4. A rotary ozonizer as claimed in claim 3, further comprising a reciprocation means connected between said other end of said motor shaft and said diaphragm type compressor.

5. A rotary ozonizer as claimed in claim 1, wherein said rotor comprises a sleeve member and supporting arm having a cross-like shape provided between said rotary shaft and said sleeve member, said rotary electrode comprising a plurality of electrodes each extending along an outer peripheral surface of said sleeve member in axial direction thereof.

6. A rotary ozonizer as claimed in claim 1, wherein said rotor comprises a sleeve member and a circular support member provided between said rotor shaft and said sleeve member, said sleeve member serving as said rotary electrode.

7. A rotary ozonizer as claimed in claim 3, further comprising a support member extending from said motor for supporting said diaphragm type compressor.

8. A rotary ozonizer as claimed in claim 1, wherein said rotor comprises a plurality of blades projecting radially from said rotor shaft.

9. A rotary ozonizer as claimed in claim 8, wherein said plurality of blades extend in axial direction of said rotor shaft.

10. A rotary ozonizer as claimed in claim 8, wherein said rotor shaft is a hollow shaft, and said blades are teeth-shaped forms protruding from said hollow shaft.

11. A rotary ozonizer as claimed in claim 8, wherein said blades are spiral ribs extending spirally along an outer peripheral surface of said rotor shaft.

12. A rotary ozonizer as claimed in claim 8, wherein each of said blades has a free end having a knife edge form.

13. A rotary ozonizer as claimed in claim 1, wherein said rotor provides a plurality of spiral projections integral with said rotor shaft.

14. A rotary ozonizer as claimed in claim 1, wherein said cylindrical body is provided with heat radiation fins at an outer peripheral portion thereof, each of said fins projecting radially outwardly and extending in axial direction of said cylindrical body.

15. A rotary ozonizer comprising:
a motor;
a cylindrical body disposed coaxially with said motor, said cylindrical body serving as a stationary electrode and having an enlarged, hollow portion adjacent the motor;
a rotor housed in said cylindrical body and having one end connected to said motor, said rotor serving as a rotary electrode;
a first electrical power supply portion having a contact member in contact with the other end of said rotor;
a second electrical power supply portion provided at said cylindrical body, said rotor and said cylindrical body defining an electric discharge space therebetween;
axial fan means disposed on one end of an outer peripheral portion of said rotor and within said enlarged portion;
at least one air inlet formed in said enlarged portion for introducing air into said electric discharge space; and
at least one ozone discharge port provided in said cylindrical body at a position opposite to said air inlet with respect to the longitudinal direction of the cylindrical body.

16. A rotary ozonizer as claimed in claim 15, further comprising a first end plate disposed to close one end of said cylindrical body and a second end plate disposed to close other end of said cylindrical body, said first end plate rotatably supporting said rotor and being formed with said air inlet, said second end plate being provided with said first electric power supply portion and being formed with said ozone discharge port.

17. A rotary ozonizer as claimed in claim 16, further comprising a rotor shaft rotatably supported by said second end plate, said first electrical power supply portion being connected to said other end of said rotor through said rotor shaft.

18. A rotary ozonizer comprising:
a motor;
rotary blades having a rotor shaft coupled to said motor, said blades being formed of electrically conductive material, radially outer end portions of said blades serving as rotary electrodes;
a casing for housing therein said rotary blades, said casing having an inner peripheral surface a part of which, with respect to the peripheral direction thereof, is formed of an electrically conductive material for serving as a stationary electrode, said casing and rotary blades constituting an air compressor;
a first electrical power supply portion connected to said rotor shaft;
a second electrical power supply portion connected to said stationary electrode; and
an ozone discharge passage extending away from said casing.

19. A rotary ozonizer as claimed in claim 18, further comprising an end plate disposed to cover an open end of said casing, said end plate being formed with at least one air inlet.

20. A rotary ozonizer as claimed in claim 18, wherein said rotary blades are sirocco fan blades.

21. A rotary ozonizer as claimed in claim 18, wherein said rotary blades are propeller fan blade.

22. A rotary ozonizer as claimed in claim 18, wherein said stationary electrode is an arcuate member which is provided detachably with respect to said casing.

* * * * *